United States Patent
Sugumar et al.

(10) Patent No.: US 8,249,072 B2
(45) Date of Patent: Aug. 21, 2012

(54) SCALABLE INTERFACE FOR CONNECTING MULTIPLE COMPUTER SYSTEMS WHICH PERFORMS PARALLEL MPI HEADER MATCHING

(75) Inventors: Rabin A. Sugumar, Sunnyvale, CA (US); Lars Paul Huse, Oppegård (NO); Bjørn Dag Johnsen, Oslo (NO)

(73) Assignee: Oracle America, Inc., Redwood City, CA (US)

( * ) Notice: Subject to any disclaimer, the term of this patent is extended or adjusted under 35 U.S.C. 154(b) by 165 days.

(21) Appl. No.: 12/402,804

(22) Filed: Mar. 12, 2009

(65) Prior Publication Data

US 2010/0232448 A1    Sep. 16, 2010

(51) Int. Cl.
*H04L 12/28* (2006.01)
(52) U.S. Cl. ....................................................... 370/392
(58) Field of Classification Search .................. None
See application file for complete search history.

(56) References Cited

U.S. PATENT DOCUMENTS

| | | | | |
|---|---|---|---|---|
| 5,448,698 | A * | 9/1995 | Wilkes | 709/245 |
| 6,115,378 | A * | 9/2000 | Hendel et al. | 370/392 |
| 6,125,399 | A * | 9/2000 | Hamilton | 709/245 |
| 6,704,831 | B1 * | 3/2004 | Avery | 710/310 |
| 7,117,301 | B1 * | 10/2006 | James et al. | 711/108 |
| 7,440,405 | B2 * | 10/2008 | Hsieh et al. | 370/235 |
| 7,496,095 | B1 * | 2/2009 | Davis | 370/392 |
| 2003/0023666 | A1 * | 1/2003 | Conway et al. | 709/201 |
| 2008/0127203 | A1 * | 5/2008 | Huang et al. | 719/313 |

OTHER PUBLICATIONS

International Search Report and Written Opinion for Application No. PCT/US2010/026911, mailed Aug. 20, 2010; 15 pages.
"InfiniBand Architecture Specification vol. 1, Release 1.2.1"; InfiniBand Trade Assocation; Nov. 2007; 1727 pages.
Michael L. Scott; "Shared Memory Models"; Workshop on Communication and Middleware for Parallel Programming Models; Apr. 2002; 29 pages.
Leonidas Kontothanassis, Robert Stets, Galen Hunt, Umit Rencuzogullari, Gautam Altekar, Sandhya Dwarkadas, and Michael L. Scott; "Shared Memory Computing on Clusters with Symmetric Multiprocessors and System Area Networks"; ACM Transactions on Computer Systems, vol. 23, Issue 3, Aug. 2005; 33 pages.
Yong Xiong, Jyh-Charn Liu, and Wei Zhao; "On the Smoothing of Traffic Flows Using On-Off Control"; Real-Time Systems Symposium, Work-in-Progress Session, Dec. 3, 2003; 3 pages.

(Continued)

*Primary Examiner* — Ayaz Sheikh
*Assistant Examiner* — Faiyazkhan Ghafoerkhan
(74) *Attorney, Agent, or Firm* — Meyertons Hood Kivlin Kowert & Goetzel, P.C.; Jeffrey C. Hood

(57) ABSTRACT

An interface device for a compute node in a computer cluster which performs Message Passing Interface (MPI) header matching using parallel matching units. The interface device comprises a memory that stores posted receive queues and unexpected queues. The posted receive queues store receive requests from a process executing on the compute node. The unexpected queues store headers of send requests (e.g., from other compute nodes) that do not have a matching receive request in the posted receive queues. The interface device also comprises a plurality of hardware pipelined matcher units. The matcher units perform header matching to determine if a header in the send request matches any headers in any of the plurality of posted receive queues. Matcher units perform the header matching in parallel. In other words, the plural matching units are configured to search the memory concurrently to perform header matching.

16 Claims, 10 Drawing Sheets

OTHER PUBLICATIONS

Fabrizio Petrini, Wu-Chun Feng, Adolfy Hoisie, Salvador Coll, and Eitan Frachtenberg; "The Quadrics Network: High-Performance Clustering Technology"; Los Alamos National Laboratory; IEEE Micro 22(1) Jan.-Feb. 2002; pp. 46-57.

* cited by examiner

Unexpected Header

| 63,62 | 61:52 | 51:32 | 31:0 |
|---|---|---|---|
| Type/Comm/App | Message Location | MPI Rank | Tag |
| | | Message Location Address [47:0] | |
| | | | Size [31:0] |

FIG. 8

Posted Receive Header

| 63,62 | 61:52 | 51:32 | 31:0 |
|---|---|---|---|
| WC | Type/Comm/App | MPI Rank | Tag |
| | | Buffer Location Address [47:0] | |
| | | Match Compl ID | Size [31:0] |

FIG. 9

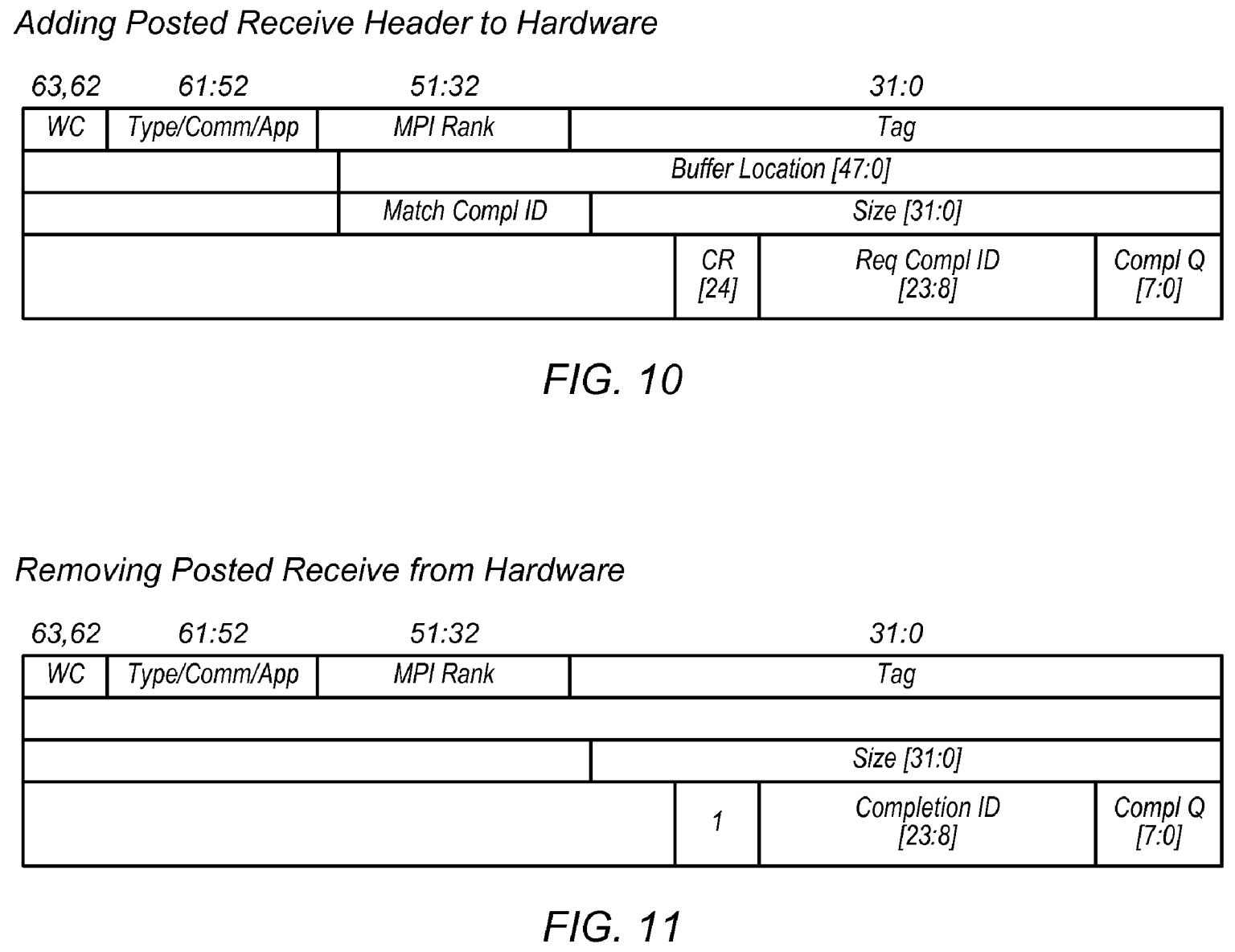

Adding Posted Receive Header to Hardware

| 63,62 | 61:52 | 51:32 | 31:0 |
|---|---|---|---|
| WC | Type/Comm/App | MPI Rank | Tag |
| | | | Buffer Location [47:0] |
| | Match Compl ID | | Size [31:0] |
| | | CR [24] | Req Compl ID [23:8] | Compl Q [7:0] |

FIG. 10

Removing Posted Receive from Hardware

| 63,62 | 61:52 | 51:32 | 31:0 |
|---|---|---|---|
| WC | Type/Comm/App | MPI Rank | Tag |
| | | | Size [31:0] |
| | | 1 | Completion ID [23:8] | Compl Q [7:0] |

FIG. 11

Queue Descriptors

| 63 | 62 61 to 52 | 51 to 42 | 41 to 32 | 31 to 22 | 21-16 | 15 to 8 | 7 to 0 |
|---|---|---|---|---|---|---|---|
| V | UEQ Count | PRQ Count | UEQ Max Entries | PRQ Max Entries | Status | MMU Ctxt | Compl Q |
| | PRQ Head Pointer | | | PRQ Tail Pointer | | | |
| | UEQ Head Pointer | | | UEQ Tail Pointer | | | Intpt Group |
| | Mask 0 | | | | | | |
| | Mask 1 | | | | | | |

SCALABLE INTERFACE FOR CONNECTING MULTIPLE COMPUTER SYSTEMS WHICH PERFORMS PARALLEL MPI HEADER MATCHING

FIELD OF THE INVENTION

The present disclosure relates generally to clusters, and more particularly to a scalable interface for interconnecting a plurality of computing platforms into a cluster.

DESCRIPTION OF THE RELATED ART

A cluster generally refers to a group of computers that have been linked or interconnected to operate closely together, such that in many respects they form a single computer. Large clusters can comprise thousands of individual computer systems that have been linked together. The components (e.g., individual computers or "compute nodes") of a cluster are often connected to each other through local area networks. Clusters generally provide greatly improved performance and/or availability over that provided by a single computer. A cluster is also typically more cost-effective than a single computer of comparable speed or availability.

A cluster generally comprises a plurality of computer systems (e.g., servers) and the "interconnect" between these computer systems. An important aspect to building large cluster systems is the interconnect. The interconnect may comprise a "fabric", e.g., the network that connects all of the servers together, as well as host adaptors that interface each of the computer systems (servers) to the fabric. One commonly used cluster interconnect is Ethernet. More recently, clusters have started using Infiniband as the interconnect. InfiniBand is a switched fabric communications link primarily used in high-performance computing and provides quality of service and failover features as well as scalability. An Infiniband interconnect generally provides lower latency, higher bandwidth, and improved reliability.

Many organizations such as research centers and national laboratories require large clusters with thousands of nodes to satisfy their compute requirements. It is very important to reduce the overhead of communication in such large clusters to allow applications to scale efficiently.

Clusters may use a protocol referred to as Message Passing Interface (MPI) for data communication. Current prior art implementations of MPI perform header matching searching in software. For example, the message arrives at the receive process and the network adapter places it in a queue. A software layer then walks through the receive buffers in the queue to determine matches. In general, performing a search via software on the host CPU impacts the message rate, due at least in part to cache misses. As the queues become large, the message rate becomes quite small. Another problem is that, because hardware is first storing the incoming message in a support queue and then moving it from there to a receive buffer, multiple copies of the payload may be required, which further impacts performance.

SUMMARY OF THE INVENTION

Embodiments of the invention relate to a scalable interface useable in creating and/or configuring clusters. Embodiments of the invention also provide improved cluster performance. The cluster may comprise a plurality of compute nodes (e.g., servers) connected by a fabric. Each of the compute nodes may comprise a host CPU and a host memory. The fabric may comprise a fabric switch which interconnects the compute nodes, e.g., using Infiniband. The fabric may also couple the compute nodes to storage devices or to external networks, such as the Internet. The compute nodes may communicate with each other using a Message Passing Interface (MPI) protocol Each compute node may comprise a compute node interface device for interfacing between the compute node and the fabric. The compute node interface device is thus configured to interface between the compute node and other compute nodes in the cluster. The compute node interface device may comprise a memory that stores a plurality of posted receive queues and a plurality of unexpected queues. Each of the posted receive queues is configured to store receive requests from a process executing on the compute node, wherein the receive requests include headers. The unexpected queues are each configured to store headers of send requests (e.g., from other compute nodes) that do not have a matching receive request in one of the posted receive queues. The memory may be implemented as a shared SRAM (static random access memory) structure.

The compute node interface device may also comprise a plurality of matcher units coupled to the memory. The matcher units are implemented in hardware and may be pipelined for improved performance. The plurality of matcher units (e.g., a plural subset of the matcher units) are configured to analyze one or more send requests received by the compute node interface device and perform header matching to determine if a header in the send request(s) matches any headers in any of the plurality of posted receive queues. The plural subset (or all) of the plurality of matcher units perform the header matching in parallel. In other words, the plural matching units are configured to search the memory concurrently to perform header matching. In one embodiment, only one matcher is assigned to search one request, but multiple searches will be in progress concurrently for different send requests. In another embodiment, a plurality of matchers are assigned to search each of one or more of the requests (or all of the requests). In other words, a plurality of matchers (set) may be assigned to search a single send request, and different sets of matchers may operate concurrently (i.e., may concurrently search the memory to perform header matching).

If a header in the send request matches a header in one of the plurality of posted receive queues, the compute node interface device is configured to store the send request in a receive buffer of the memory, e.g., as indicated by the matching receive request. If the send request header does not match any entries in the posted receive queues, the send request header is stored in one of the unexpected queues. When a new receive request is later stored in the posted receive queue, one or more, and in one embodiment a plural subset, (typically only one matcher is assigned to search one request, but multiple searches will be in progress concurrently) of the plurality of matcher units is configured to analyze the new receive request and perform header matching (in parallel) to determine if a header in the new receive request matches any send request headers in any of the plurality of unexpected queues.

In one embodiment, the memory is dynamically partitioned among the plurality of posted receive queues and unexpected queues to provide separate queues for different processes, applications and/or MPI ranks. For example, the compute node interface device may be configured to dynamically adjust memory allocation of the posted receive queues for different processes executing on the compute node. Further, the compute node interface device may be configured to dynamically adjust relative memory allocation of the posted receive queues and the unexpected queues.

In addition, receive requests may support "wildcard" values for one or more fields in the header of the receive request, wherein a field with a wildcard value is not searched during the header matching. The compute node interface device may comprise a second memory (which may be part of the first memory) coupled to the plurality of matcher units, that stores one or more header masks. For a first receive request comprising a header having a first field containing a wildcard value, one or more of the matcher units is configured to use the header mask during header matching to mask out (and hence ignore) the first field containing the wildcard value.

The matcher units may be configured to perform header matching to implement a rendezvous data transfer protocol without host CPU intervention. In some embodiments, the compute node interface device is configured to utilize resources of the compute node, as needed, e.g., dynamically. For example, the compute node interface device may be configured to implement at least a subset of the unexpected queues in the host memory of the compute node.

In one embodiment, the compute node interface device also comprises an unexpected message buffer coupled to the memory. The unexpected message buffer is configured to store a payload of a send request that does not have a matching header in any receive requests stored in the plurality of posted receive queues. Thus, when a receive request is later stored in one of the posted receive queues and matched to this send request, the payload can be accessed without requiring a memory to memory transfer.

The compute node interface device may also be configured to perform header matching for intra compute node transfers in response to a command received by host software executing on the compute node. Further, the compute node interface device may be configured to synchronize header matching with other compute node interface devices comprised on the compute node.

BRIEF DESCRIPTION OF THE DRAWINGS

A better understanding of embodiments of the present invention can be obtained when the following detailed description of the preferred embodiment is considered in conjunction with the following drawings, in which:

FIG. 8 illustrates an unexpected header;

FIG. 9 illustrates a posted receive header;

FIG. 10 illustrates adding a posted receive header to hardware;

FIG. 11 illustrates removing a posted receive header from hardware; and

FIG. 12 illustrates queue descriptors.

Figure 1:
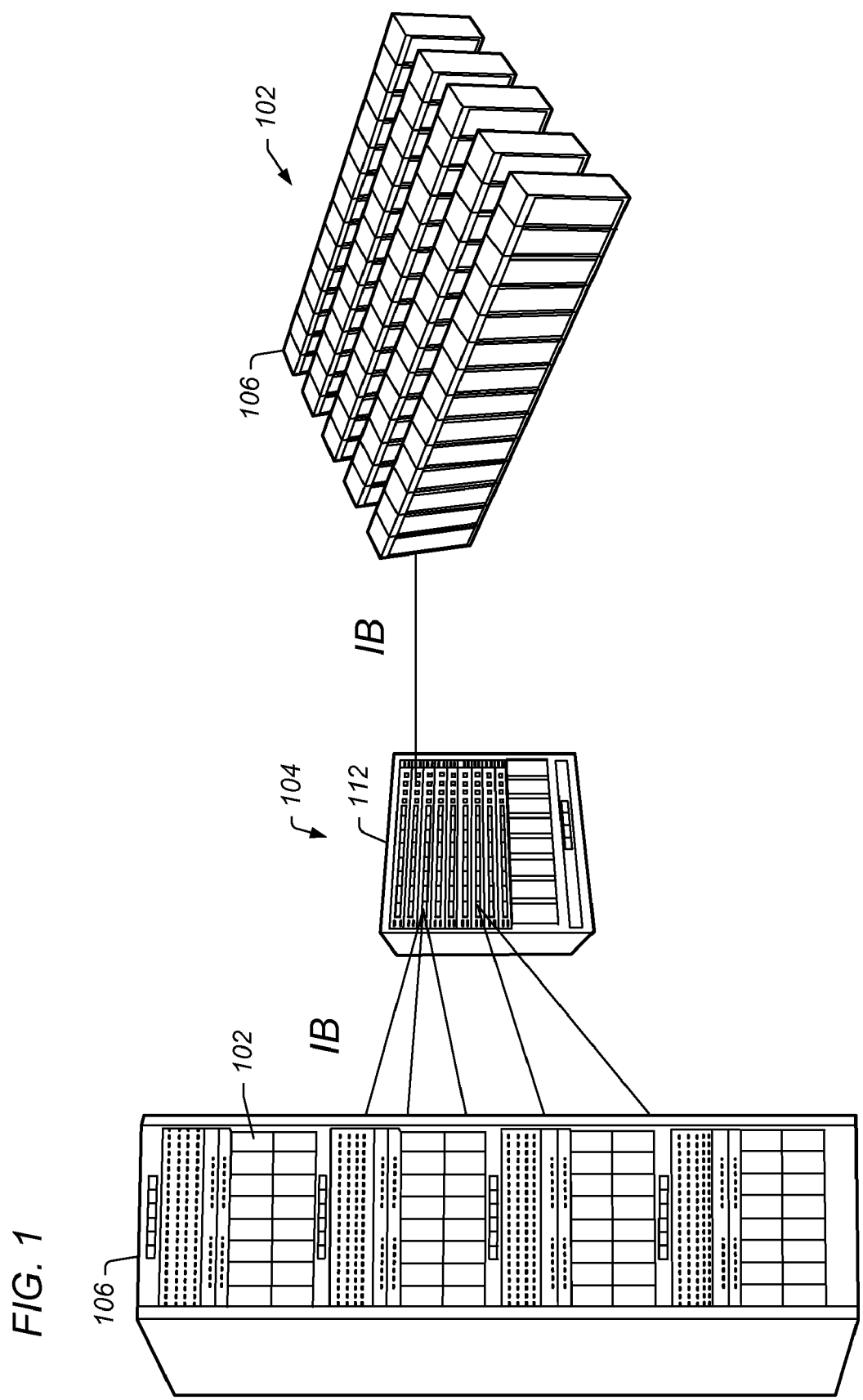
FIG. 1 illustrates an exemplary cluster according to one embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Definitions

Compute node—refers to a computer system having a processor (or CPU) and memory. A Compute node may have a single processor (which may be single core or multi-core) or may have a plurality of processors. One example of a Compute node is a blade server.

Network Fabric—Refers to a Network or Interconnect for Connecting Multiple Compute Nodes Compute node Interface Device—refers to an interface for coupling a Compute node to a Network Fabric FIG. 1 illustrates an exemplary cluster system according to one embodiment of the invention. As shown, the system may comprise a plurality of computer systems or compute nodes 102 that are connected together by an interconnect 104. The compute nodes 102 may take various forms. In the embodiment of FIG. 1, the compute nodes 102 comprise blade servers that are housed in one or more racks 106. The interconnect 104 may comprise a fabric switch 112 as shown. The interconnect 104 may support only a single protocol, or may support a plurality of protocols. In the exemplary embodiment shown, the interconnect 104 may support the Infiniband (IB) protocol.

On the left side of exemplary FIG. 1, the cluster comprises one or more racks 106 each comprising 4 blade server chassis' which each comprise a plurality of blade servers (compute nodes) 102. The blade servers 102 on the left connect to the fabric switch 112 through Infiniband. In one embodiment, the blade servers 102 connect to the fabric switch 112 over Infiniband in all cases. As shown on the right side of FIG. 1, the fabric switch 112 may couple to additional racks 106 having additional compute nodes 102.

Each of the compute nodes 102 may comprise a compute node interface device, referred to herein as Scalable Interface (SIF), (110 FIG. 2) which provides an interface for the respective compute nodes 102. The compute node interface device or SIF 110 couples to a respective compute node 102 and provides an IB interface for the compute node 102 to the fabric 104, e.g., to the fabric switch 112.

Figure 2:
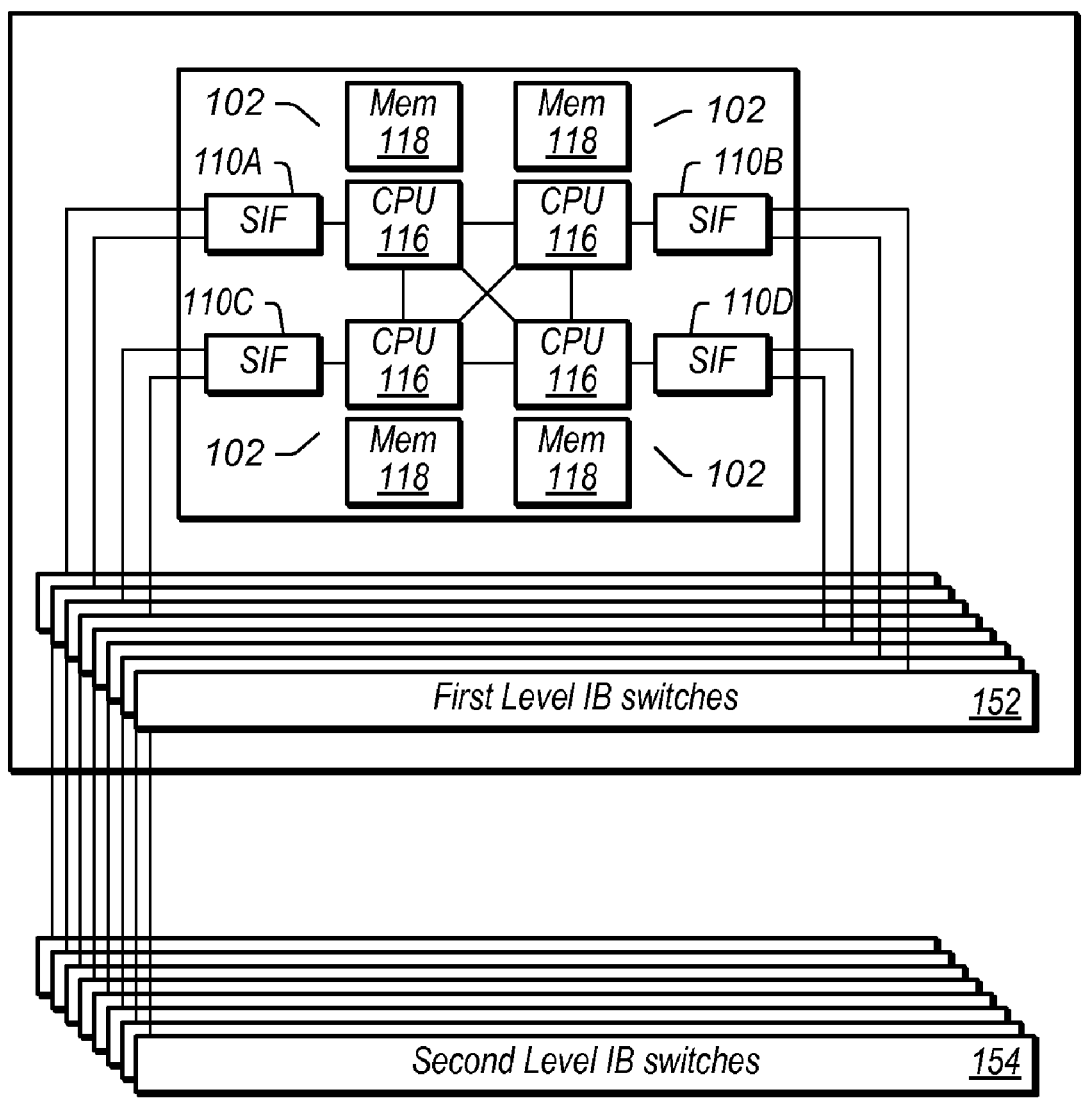
FIG. 2 is a block diagram of a portion of the cluster of FIG. 1, showing an exemplary compute node (4 server blade) connected to several levels of switches.

FIG. 2 is a block diagram illustrating a portion of a cluster system comprising an exemplary server blade (compute node 102) connected to form the cluster. Each compute node 102 comprises a corresponding Scalable Interface (SIF) block 110 (labeled as 110A-110D). Each CPU (or compute node) 102 couples to its respective Scalable Interface (SIF) 110A-D also located on the blade server. The SIF blocks 110 (110A-110D) each provide an Infiniband interface to a respective compute node 102. The SIF blocks 110 (110A-110D) each comprise a host interface for coupling to the host bus or processor bus of its respective compute node 102, as well as an Infiniband interface. The SIF block 110 is discussed in more detail with respect to FIG. 3.

Each of the SIF blocks 110 (110A-110D) may couple to Infiniband switches 152, referred to in FIG. 2 as First Level IB switches 152. The First Level IB switches 152 in turn may couple to Second Level IB switches 154, as shown. The First Level IB switches 152 may couple to the Second Level IB switches 154 through cables, as shown. There may be additional levels of IB switches.

Figure 3:
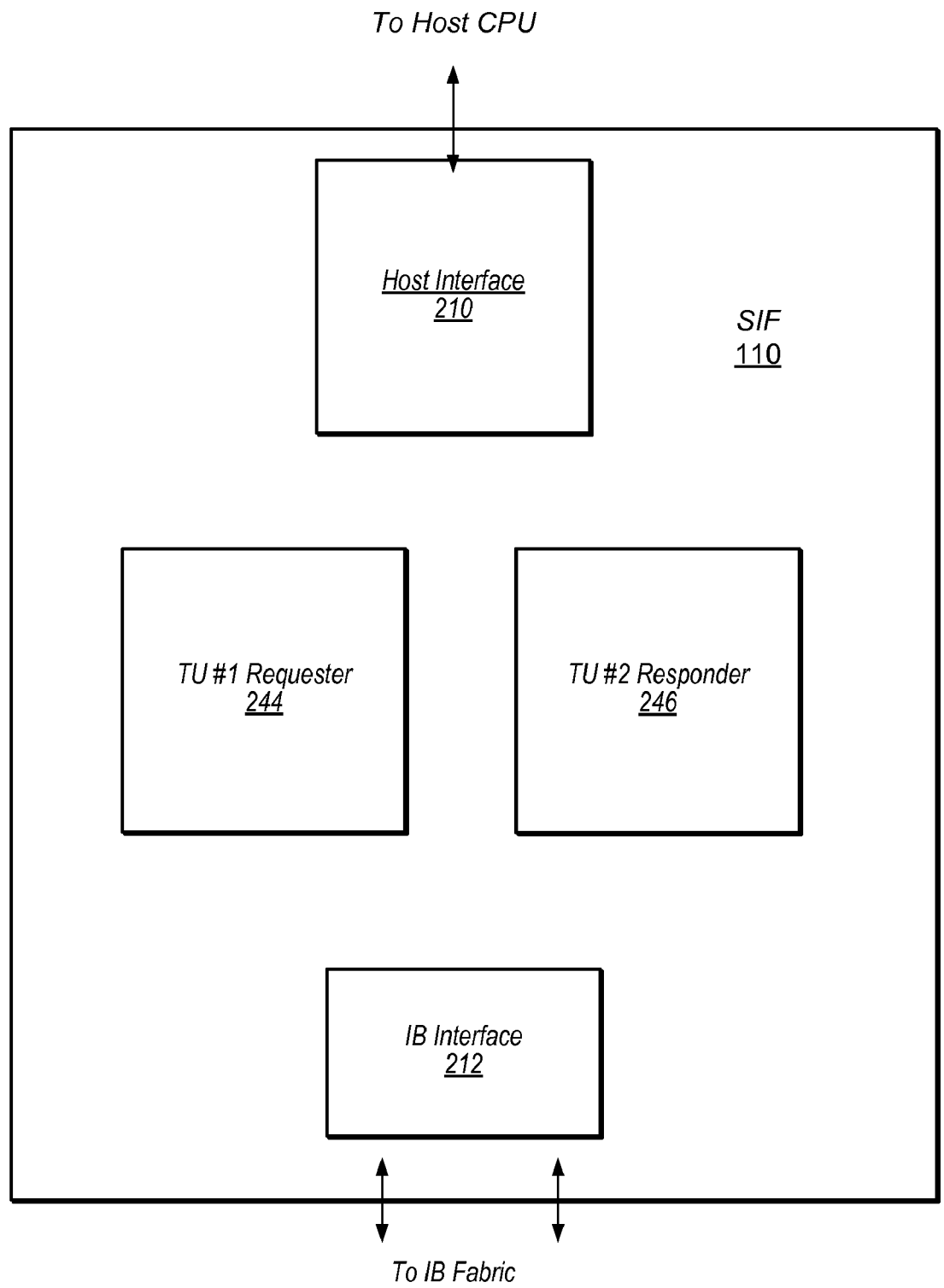
FIG. 3 is a block diagram of an exemplary scalable interface (SIF) used in interconnecting the various compute nodes in the cluster of FIG. 1.

FIG. 3 is a block diagram of an exemplary Scalable Interface (SIF) block 110. The SIF network adapter 110 operates as an interface or I/O adapter for each compute node 102 in the cluster. In one embodiment, the SIF 110 does not include a general purpose CPU and does not execute an operating system, and hence is a hardware-centric structure. The SIF 110 provides various services in hardware that would normally require software execution.

As shown, the SIF block 110 includes a host bus interface 210 for coupling to a computer system, e.g., in blade server 102. The SIF block 110 also includes a network fabric interface such as Infiniband interface 212, for coupling to Infiniband, e.g., for coupling to the network fabric 104.

The exemplary SIF block 110 comprises a TU#1 (Transaction Unit) Requestor block 244 and TU#2 Responder block 246. The TU#1 Requestor block 244 generates/processes requests that are provided to other computer systems. The TU#2 Responder block 246 is responsible for responding to incoming packets, e.g., incoming send requests from other compute nodes 102. The TU#1 Requestor block 244 and the TU#2 Responder block 246 may each couple to the host bus interface 210 and the IB interface 212.

TU#1 244 is the Requester TU. All requests sent by SIF 110 go through one of the TUs. SIF 110 supports the Infiniband (IB) reliable communication protocol, whereby in one implementation every request is properly acknowledged by the receiver before the request is completed at the sender. SIF 110 supports multiple command registers for applications to deposit commands—each command register typically dedicated to a host process running on a core. As the deposited commands are kicked off with doorbells, the commands merge into a stream of commands that then feeds into the TU scheduler which schedules them onto available threads/command-slots on the 64 thread engine. A doorbell is a write issued by software running on a CPU to an address mapped to a device (such as a network adapter) which causes the device to perform some action (such as sending a packet over the network fabric). Thus a doorbell is analogous to a house doorbell in the sense that it tells the device that some new action is needed.

TU#2 246 is the Responder TU. All incoming requests are directed to the Responder TU (TU#2) 246 which processes the packet, ultimately delivering the packet to off-chip or on-chip memory or to other logic for processing collectives. The Responder TU (TU#2) 246 accesses a header matching block (FIG. 4) comprising a large header store that can hold many thousands of headers, a buffer to hold a send request payload when a matching receive is not immediately found, and many matcher units to perform multiple searches in parallel. When a successful match is found, the incoming payload is directly copied into the receive buffer in memory.

MPI Header Matching

MPI allows out of order association of receive buffers to incoming packets, which may be based on a tag, source or other criteria. For example, assume a situation where two processes are communicating over the fabric. According to the process model, the sending process sends a message. The receiving process makes available one or more receive buffers, referred to as the posted receive queue or PRQ (512, FIG. 4). The incoming message may be associated with any of the receive buffer and not necessarily the first one. The receiving process then examines the message and takes an appropriate action.

The MPI maintains characteristics for each receive buffer, such as the sender, the tag (a value agreed upon by the sender and receiver), type of message, etc. Based on this characteristic, the MPI searches the available receive buffers that have been posted by the receiving process (posted receive queue 512) and decides which of those receive buffers is the best candidate for the incoming message. Thus, as described above, the MPI header matching effectively "walks down" the list of available headers and finds the header that matches the incoming message.

Figure 4:
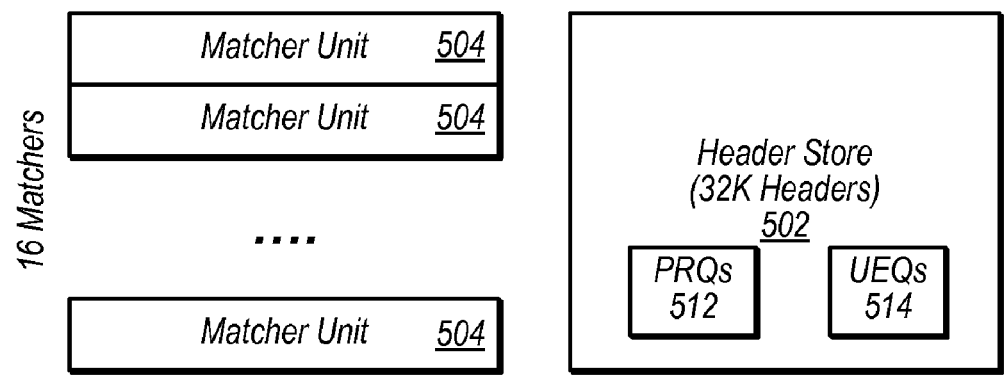
FIG. 4 is a block diagram of a portion of a SIF used in performing MPI Header Matching.
Figure 4:
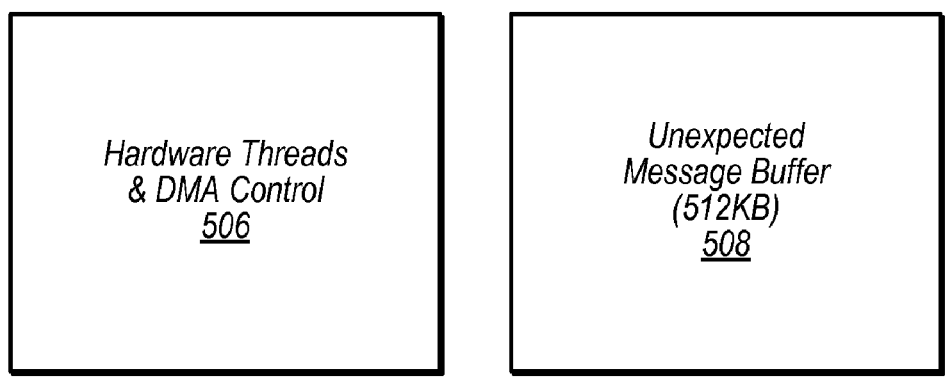

FIG. 4 provides a high level overview of a portion of the compute node interface device (SIF) 110 that performs MPI (Message Passing Interface) header matching in hardware. More particularly, FIG. 4 may illustrate an MPI header matching system 400. The system 400 may comprise a single hardware chip, or multiple discrete devices, as desired. As shown, the MPI header matching system 400 may comprise a Header Store 502 which comprises a plurality of headers, e.g., up to 32 k headers. The Header Store 502 comprises one or more posted receive queues (PRQs) 512, as shown and as described below. The Header Store 502 may also comprise one or more unexpected queues (UEQs) 514, as shown and as described below. The Header Store 502 may be comprised in the TU#2 block 246.

The MPI header matching system 400 in the SIF 110 may also comprise a plurality of matcher units (which may be implemented as matcher pipelines) 504 coupled to the Header Store 502. The matcher units (also called matchers) 504 may comprise logic circuitry which implements one or more state machines. The matcher units 504 may be implemented in various ways, such as an ASIC (Application Specific Integrated Circuit), an FPGA, or discrete logic, or combinations thereof, among others. The matcher units 504 are implemented in hardware and may be pipelined for improved performance. The matcher units 504 thus perform header matching in hardware as described herein. The matcher units 504 may be comprised in the TU#2 block 246.

The MPI header matching system 400 may further comprise Hardware Thread and DMA Control block 506. In one embodiment, the SIF 110 also comprises an Unexpected Message Buffer 508 coupled to the Header Store 502. Unexpected send request messages can be stored in the Unexpected Message Buffer 508 temporarily until a posted receive queue match is determined for these unexpected messages. More specifically, the Unexpected Message Buffer 508 is configured to store a payload of a send request that does not have a matching header in any receive requests stored in the plurality of posted receive queues 512. Thus, when a receive request is later stored in one of the posted receive queues 512 and matched to this send request, the payload can be accessed without requiring a memory to memory transfer. The MPI header matching system further comprises a plurality of header queue descriptors, e.g., 128 header queue descriptors. The header queue descriptors may be used to access and control posted receive queues 512 and unexpected queues 514, as described further below.

The compute node interface device (SIF) 110 may thus comprise a memory 502 that stores a plurality of posted receive queues 512 and a plurality of unexpected queues 514. Each of the posted receive queues 512 is configured to store receive requests from a process executing on the compute node 110, wherein the receive requests include headers. The unexpected queues 514 are each configured to store headers of send requests (e.g., from other compute nodes 110) that do not have a matching receive request in one of the posted receive queues 512. The Header Store memory 502 may be implemented as a shared SRAM (static random access memory) structure.

In one embodiment, the Header Store 502 is dynamically partitioned among the plurality of posted receive queues 512 and unexpected queues 514 to provide separate queues for different processes, applications and/or MPI ranks. For example, the SIF 110 may be configured to dynamically adjust memory allocation of the posted receive queues 512 for different processes executing on the compute node. Further, the SIF 110 may be configured to dynamically adjust relative memory allocation of the posted receive queues 512 and the unexpected queues 514.

Figure 5:
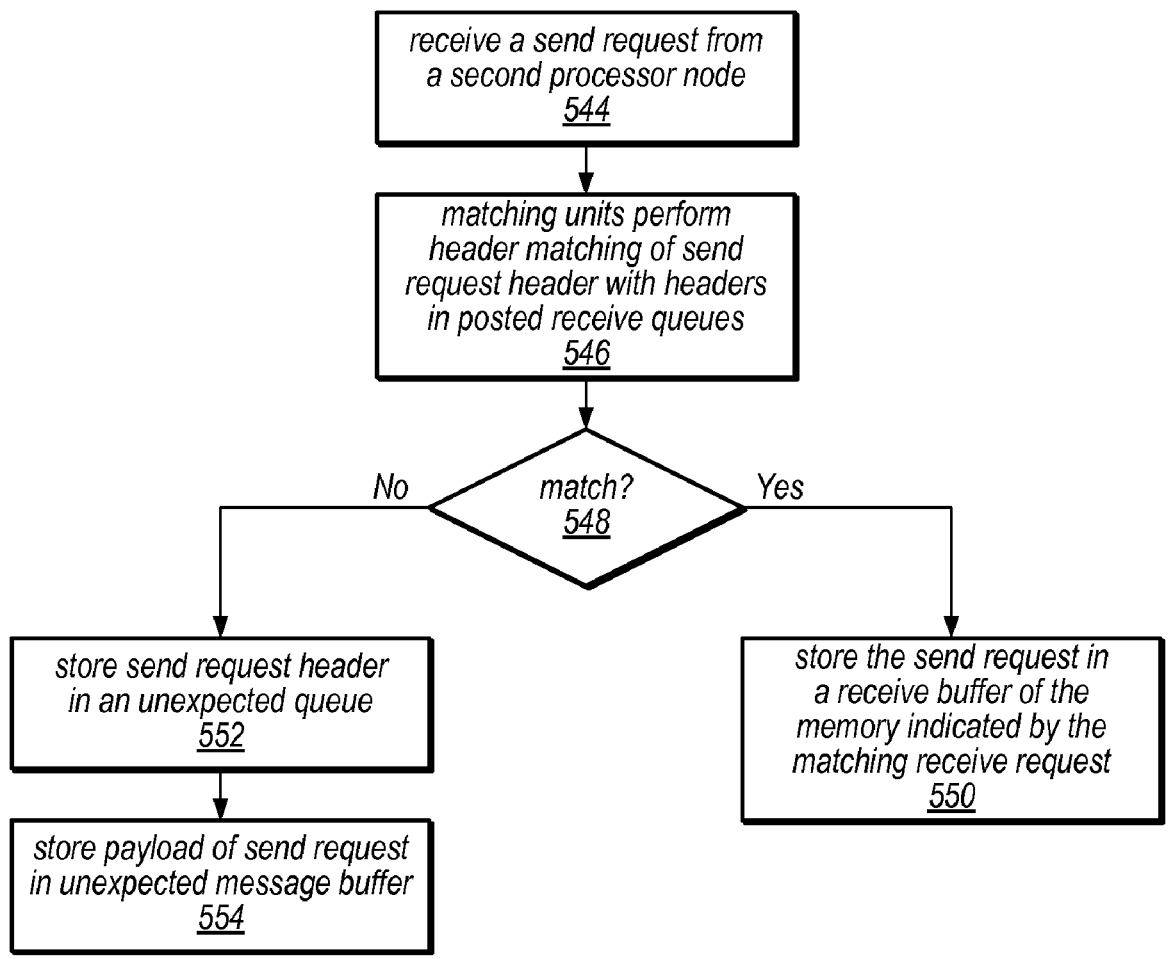
FIGS. 5 and 6 are flowchart diagrams illustrating MPI header matching.

FIG. 5 is a flowchart diagram illustrating exemplary operation of the header matching system in a first SIF 110 comprised in a first compute node 102.

As shown in 544 a send request is received from another compute node 102.

In 546, the plurality of matcher units 504 (e.g., a plural subset of the matcher units) are configured to analyze the send request received by the SIF 110 (in 544) and perform header matching to determine if a header in the send request matches any headers in any of (a subset or all of) the plurality of posted receive queues 512. For example, one or more receive requests may optionally have been received from a process executing on the first compute node 110 and stored in one or more posted receive queues 512 in the Header Store 502. In one embodiment, each send request is typically searched against only one posted receive queue 512.

For example, if the SIF 110 includes 64 matcher units 504, a plural subset (e.g., 8, 16, 32, etc.) or all (all 64) may be used to perform the header matching. The plural subset (or all) of the plurality of matcher units 504 perform the header matching in parallel. In other words, the plural matching units 504 are configured to search the memory concurrently to perform header matching. Thus for each incoming send request packet or message, the matcher units 504 examine or "walk down" the appropriate posted receive queue(s) 512 to determine if there is a match. The plural matching units 504 are configured to search multiple queues concurrently, and/or the plural matching units 504 are configured to concurrently search the same queue. The matcher units are typically used to search different requests. For example, the first incoming packet may be assigned to Matcher 1, the second incoming packet may be assigned to Matcher 2, etc. In one embodiment, multiple matchers work in parallel on the same incoming packet to reduce delay.

In 548, if a header in the send request matches a header in one of the posted receive queues 512, the SIF 110 is configured to store the send request in a receive buffer of the memory 502 in 550. For example, in 550 the SIF 110 may store the send request (e.g., the payload of the send request) in a receive buffer location indicated by the matching receive request. In 548 if the send request header does not match any entries in the posted receive queues 512, the send request header is stored in one of the unexpected queues 514 in 552, and the payload of the send request may be stored in the Unexpected Message Buffer 508 at 554.

In one embodiment, receive requests may support "wildcard" values for one or more fields in the header of the receive request, wherein a field with a wildcard value is not searched during the header matching. The SIF 110 may comprise a second memory (which may be part of the Header Store memory 502) coupled to the plurality of matcher units 504, that stores one or more header masks. For a first receive request comprising a header having a first field containing a wildcard value, one or more of the matcher units is configured to use the header mask during header matching to mask out (and hence ignore) the first field containing the wildcard value.

Figure 6:
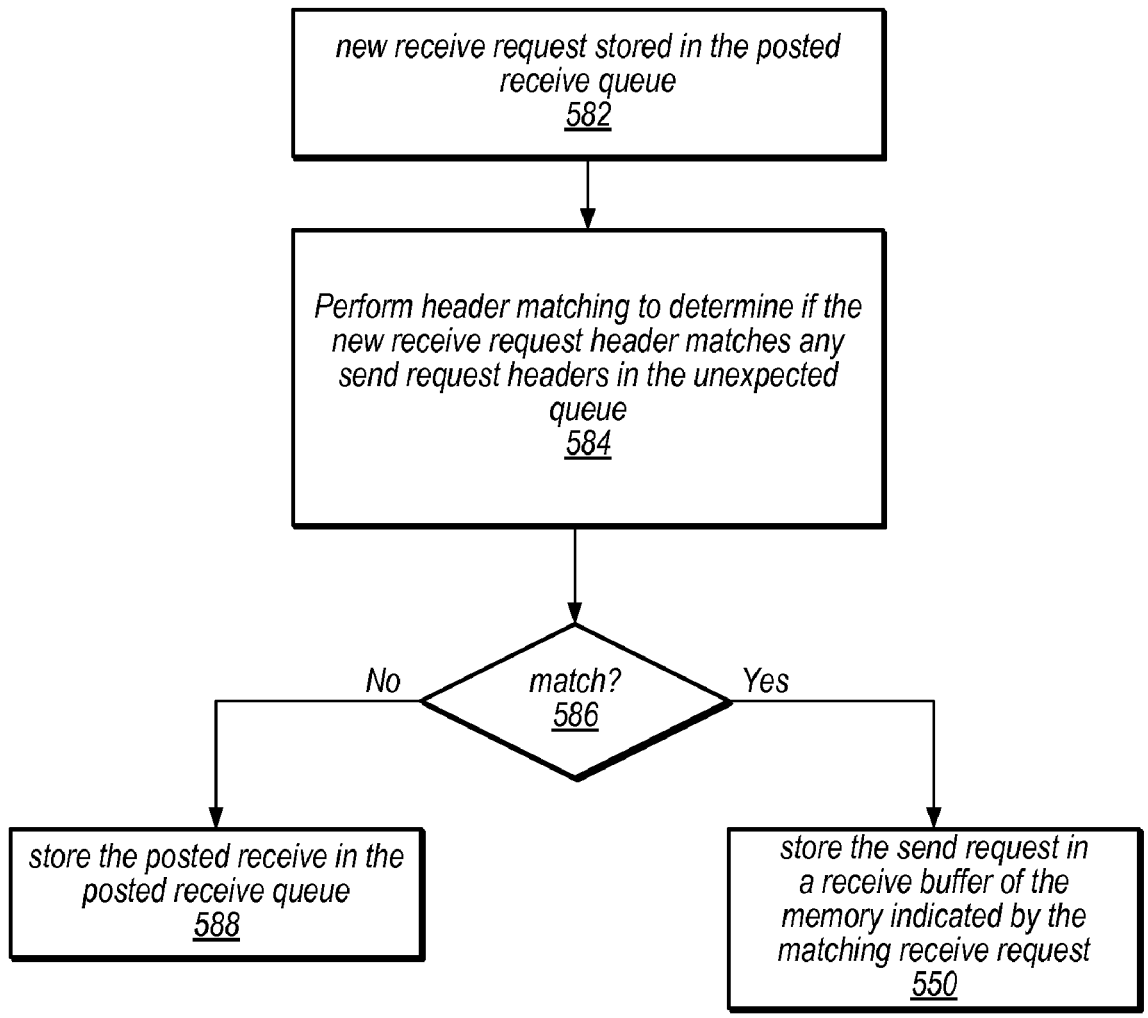

As shown in FIG. 6, when a new receive request is later issued by host CPU in the posted receive queue 512 at 582, in 584 one or more of the plurality of matcher units 504 is configured to analyze the new receive request and perform header matching (in parallel) to determine if a header in the new receive request matches any send request headers in any of the plurality of unexpected queues 514. In one embodiment, each posted receive is typically searched against only one unexpected queue 514. The plurality of queues is provided to allow multiple applications or processes to use the header matching facility. As noted above, performance of the header matching in parallel may refer to one or more of the matcher units 504 examining the one or more (or plurality of) unexpected queues 514, wherein a plurality of matcher units 504 may be operating for different requests concurrently. Alternatively, a plurality of matcher units 504 may be operating concurrently for a single request. If the header in the new receive request matches a send request header in one of the unexpected queues 514 as determined in 586, then in 550 (also in FIG. 5) the send request (e.g., the payload of the send request) is stored in a receive buffer indicated by the matching receive request. If the posted receive does not match any entry in the unexpected queue 514, the posted receive is stored in the posted receive queue 512 in 588. In one embodiment, storage in the posted receive queue (PRQ) 512 happens only when there is no match in the unexpected queue (UEQ) 514.

Therefore, in summary, when an incoming message is received, the MPI header matching searches the available receive buffers in the posted receive queue 512 and in some cases does not determine any receive buffer matches for the incoming message. In these cases, the incoming message is held in an unexpected queue 514 until a matching receive buffer is posted. Thus, as incoming messages arrive, if the incoming messages do not match any posted receive buffer 512, the incoming messages are placed in the unexpected queue 514. Then, as the receive process posts new receive buffers, those messages are searched against the unexpected queue 514 first to determine if the message they are targeting has already arrived. Thus, in one embodiment, the MPI header matching utilizes searching of posted received messages and queues at the receiver for unexpected messages.

The matcher units 504 may be configured to perform header matching to implement a rendezvous data transfer protocol, e.g., without host CPU intervention. In some embodiments, the SIF 110 is configured to utilize resources of the SIF's compute node 102, as needed, e.g., dynamically. For example, the SIF 110 may be configured to implement at least a subset of the unexpected queues 514 in the host memory of the SIF's compute node 102.

The SIF 110 may also be configured to perform header matching for intra compute node transfers in response to a command received by host software executing on the compute node. Further, the SIF 110 on a compute node may be configured to synchronize header matching with other SIFs comprised on the same compute node. In another embodiment, the SIF 110 on a compute node may be configured to synchronize header matching with other SIFs comprised on other compute nodes 102 in the cluster.

Therefore, to summarize the above, the system described herein performs MPI header matching in hardware for greater efficiency and reduced latency. Performance of MPI header matching in hardware is a considerable improvement over current prior art implementations.

As discussed in the Background Section above, current prior art implementations of MPI perform header matching searching in software. For example, the message arrives at the receive process and the network adapter places it in a queue. A software layer then walks through the receive buffers in the queue to determine matches. In general, performing a search via software on the host CPU impacts the message rate, due at least in part to cache misses. As the queues become large, the message rate becomes quite small. Another problem is that, because hardware is first storing the incoming message in a support queue and then moving it from there to a receive buffer, multiple copies of the payload may be required, which further impacts performance.

Another issue with current implementations is rendezvous interrupt overhead. The model described above which involves a sending process sending a message and the receiving process determining where the message should be placed works fairly well for reasonable sized messages. However, when the message becomes very large, e.g., in the Megabyte range, the above method is very inefficient. For example, with large messages, it becomes undesirable to store the message temporarily while determining the appropriate receive buffer, due to the size of the message. A rendezvous protocol is desired to avoid the cost of multiple copies of the message. A rendezvous protocol is a handshake method, where the sending process sends a rendezvous request to a receiving process. The receiving process searches a portion of the receive queue and eventually finds a match. Once the receiving process has found a matching receive buffer, the receiving process sends a pointer to the receive buffer (an address) to the sending process. Now the sending process has the address of the receive buffer, and the sending process now has the capability to perform RDMA (remote direct memory access) to that receive buffer. RDMA allows data to be moved directly from the memory of one computer to the memory of another computer without involving either computer's operating system. This permits high-throughput, low latency networking. If the sending process is not capable of RDMA, it can still perform a send operation as described above, now that the sending hardware knows that the matching receive has been posted.

If the header matching is not performed in hardware, the software would be required to determine what receive buffer should be used. Whenever a rendezvous request arrives, hardware would be required to interrupt the software to perform the matching immediately and provide the address back to the sender. These interrupts add a large amount of overhead.

Thus, in one embodiment of the invention, hardware based header matching is performed to eliminate the overhead described above. In one embodiment, the MPI header matching system comprises on-chip header storage and multi-threaded matchers as shown in FIG. 4. This provides complete offload of matching from the host CPU on the compute node 102. Thus, in one embodiment, the sender sends a rendezvous request, the header matching is performed in hardware, and the hardware then generates a response to the sender containing the address of the receive buffer, i.e., telling the sender the location where the data should be written. The sender can then perform an RDMA write to this address. Performance of header matching in hardware significantly (and in one embodiment completely) offloads the host CPU from having to perform this operation in software. In addition, since the headers are held in the on-chip structure, i.e., the SIF 110 (the header store 502), there are no cache misses.

The following provides greater detail on exemplary embodiments of MPI header matching. Note that the following description is exemplary only, and other embodiments are also contemplated.

The Message Passing Interface (MPI) is a standardized language independent communication protocol or API (Application Programming Interface) used to program parallel computers. In MPI, the processes involved in the execution of a parallel program are identified by a sequence of non-negative integers, referred to as the "ranks". If there are p processes executing a program, they will have ranks 0, 1, . . . p−1.

MPI supports both point-to-point and collective communication. MPI point-to-point communications performs message passing using send (MPI_Send) and receive (MPI_Recv) commands. Thus MPI_Send and MPI_Recv are the two basic point to point operations in MPI. The send command sends a message to a designated process, and the receive command receives a message from a process.

In one exemplary implementation, send and receive commands may be specified as follows:

int MPI_Send(void* buf, int count, MPI_Datatype datatype, int destin, int tag, MPI_Comm comm)

int MPI_Recv(void* buf, int count, MPI_Datatype datatype, int source, int tag, MPI_Comm comm, MPI_Status *status)

In sending a send request to the receive process, the following fields and information may be packaged by the MPI library (in software).

1. Source (implicit) and destination (explicit) MPI process (called MPI rank);

2. An application supplied field called tag used as a packet type identifier;

3. Communication group (called MPI communicator) for traffic separation;

4. If the communication connection or resources are shared by all local processes, an application ID assigned by an MPI scheduler may identify the receiving and sending MPI process;

5. Communication type (reflecting the MPI send flavors e.g. collective, immediate, synchronous, persistent, ready, buffered, in-line, local or remote); and 6. Inline payload data or descriptor on where to retrieve the payload data.

Similarly, application receive requests specify header fields they target and where to place received payload data and associated request completion status. The MPI infrastructure operates to get the first send to the MPI rank whose header matches a receive target and deliver the corresponding payload to the application as data for the receive. Some fairness between senders to the same MPI process is assumed, and messages are non-overtaking, i.e., if several send requests match a receive request the first match from the process is selected. The receive is allowed to use wild cards on source and tag (any_source, any_tag). The MPI message envelope refers to the tuple of source, destination, tag and communicator. The MPI 1.x standard requires tag range to be from 0 to no less than 32767 (actual range defined by the attribute MPI_TAG_UB) i.e. 16 bit or more.

In practice, the above MPI specification results in two queues for each MPI process residing on the receiver node:

1. The posted receive queue (PRQ) 512 holds receive requests that are posted by the application and not yet matched to any send request; and 2. The unexpected send queue (UEQ) 514 contains send requests that have been received from the fabric or local host, and not yet matched to any receive request.

The PRQ and UEQ queues 512 and 514 can reach up to 100s of entries per MPI rank. As discussed above with respect to FIG. 5, when the application posts a receive, the matcher units 504 first (sequentially/in-order) matches against the entries in the UEQ 514 until a match is found (if any), or if no match is found the request is (atomically) appended to the PRQ 512. When a packet is received from the fabric (e.g., a local send request is posted) the matcher units 504 first (sequentially/in-order) matches against the entries in the PRQ 512 until a match is found, or if no match is found in the PRQ 512 the request is (atomically) appended to the UEQ 514. The atomic append is used to maintain the nonovertaking requirement from the MPI standard.

As described herein, the header matching is performed in hardware by a plurality of matcher units 504 which operate to concurrently (or simultaneously) analyze the respective queues for matches. This provides performance benefits over a software implementation, where both the UEQ 514 and the PRQ 512 are maintained in software, and software executes code to match send requests to posted receives.

In a software implementation, when queues are large, matching overhead is significant and could become a performance limiter. In addition, given the delay of interrupting the host CPU 116 and performing the matching, it is not practical to hold incoming data on the SIF 110 until the match is determined. Accordingly, the SIF 110 may copy data to a temporary buffer in system memory, and when software identifies the match, data is copied from the temporary buffer to the receive buffer. Also, in an embodiment where an embedded processor is present on the SIF 110, the embedded processor may not have sufficient compute power to handle the matching in software. Each SIF 110 can have 16 or 32 associated cores/MPI ranks, which is too great of a processing burden for one embedded processor to support.

Thus, in one embodiment of the present application, as described herein, the PRQ 512 and the UEQ 514 are maintained in hardware in SIF SRAMs and incoming packets and new receives posted by host software are matched in hardware. The sections below describe the hardware structures that are implemented on the SIF 110, the programming interfaces host software uses to setup queues and control the matching and the copy operations.

Hardware Structures
Packet Processing Threads (HWT—Hardware Threads)

SIF 110 has a set of NUM_RESP_HW_THDS (NUM_RESP_HW_THDS=32 in one embodiment) hardware threads (HWTs) for processing incoming IB packets. These threads have overall responsibility for parsing incoming packets, performing IB specified validity checks, determining disposition of packets (to host memory, to embedded processor, to header matching), initiating DMA reads and writes to host memory, and returning acks (or naks) to the requesting node. A payload buffer is associated with the threads to hold incoming packets while they are being processed.

Unexpected Message Buffer (UMB)

Figure 7:
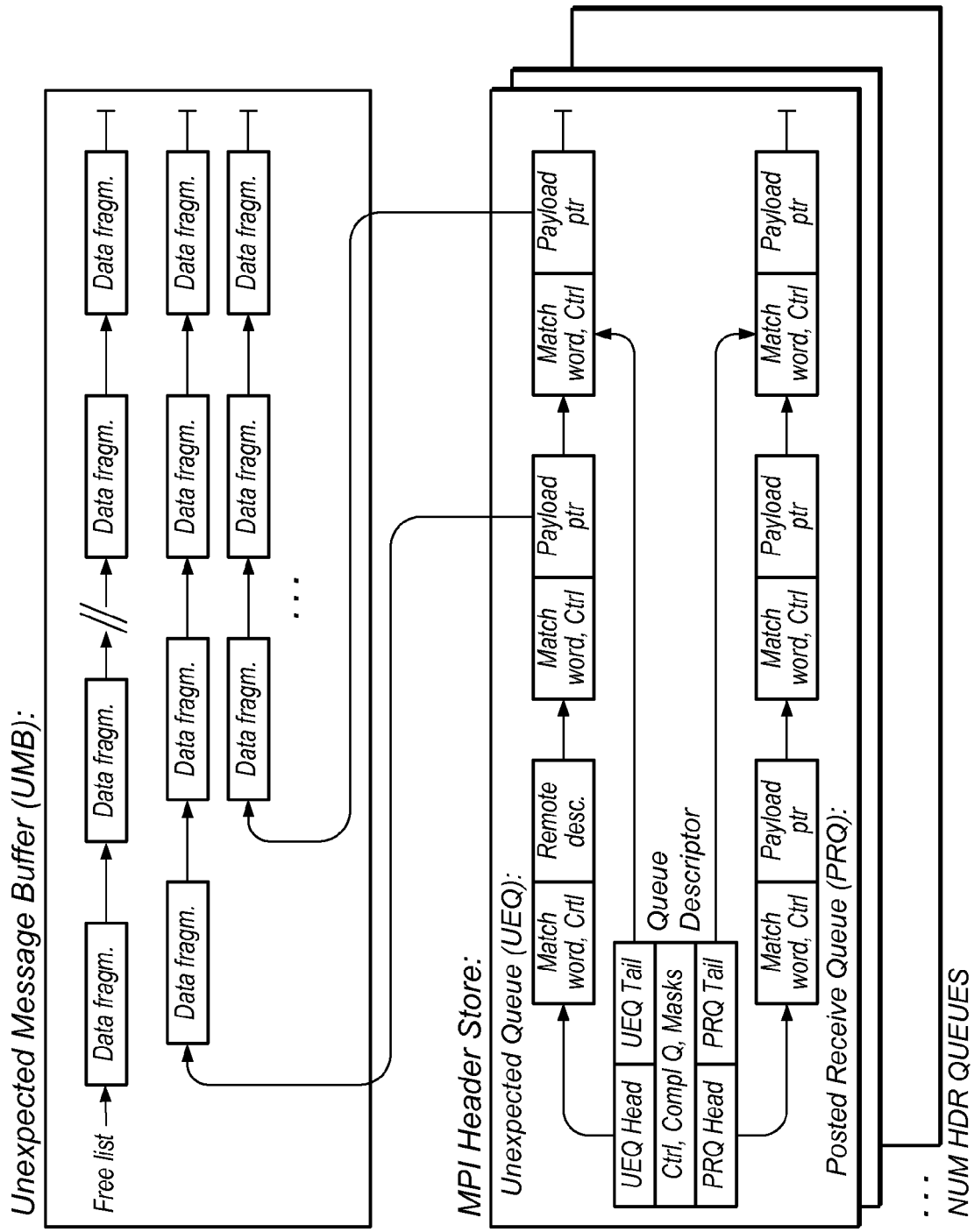
FIG. 7 illustrates exemplary embodiments of the Unexpected Message Buffer and MPI Header Store.

SIF 110 may provide an unexpected message buffer (UMB) to hold unexpected messages. In one embodiment, the size of the UMB is 512 KB. The buffer is broken into smaller fragments (64 B or 128 B). Multiple fragments are combined in a linked list to form larger messages. This structure is illustrated in FIG. 7. Fragments are allocated from a free list as messages are entered into the UMB, and fragments are freed later as matches are identified and messages are copied into host memory 118.

Header Store

SIF 110 has a large header store (e.g., size 1 MB) for holding posted receive headers and unexpected message headers (illustrated in FIG. 7). Headers may be maintained in linked lists—one for posted receives and one for unexpected sends. There is typically one pair of linked lists per MPI rank—e.g., at 32 B per header and 32 MPI ranks per SIF 110, a 1 MB header store has space for up to 1 K header queue entries per MPI rank. Software may divide available header store space flexibly among MPI ranks and between posted receive queues 512 and unexpected queues 514. For example, when one rank handles most communication, software may allocate a high fraction of available headers to that rank, and reduce allocation for other ranks. Software may also provide more than one queue for an MPI rank, partitioning posted receives among the queues based on sender MPI rank, communicator, or tag. Such partitioning shortens search queue lengths; however, this partitioning may not be performed when wildcards are used—depending on what field is "wildcarded" and how partitioning is done. There are NUM_HDR_QUEUES (NUM_HDR_QUEUES=128 for instance) pairs of header queues per SIF. Each header queue is described by a descriptor. As shown in FIG. 7, the payload pointer of entries in the unexpected queue 514 may point to data in the unexpected message buffer 508. The unexpected message buffer 508 may be maintained as linked lists of buffer fragments to allow messages of various sizes to be co-resident and allow flexible allocation and deallocation of buffer space.

Header structures are described below. The header match word used on compares maybe 64 bits, where the most significant two bits may encode wild cards—source, tag and other MPI matching values are then located in this 64-bit word.

FIGS. 8-12 illustrate exemplary structures used in one embodiment of the invention. In the structures shown in FIGS. 8-12, empty fields are reserved. Fields with a variable width are noted below, and other fields are fixed width. Variable width fields are in the 64-bit match word—providing applications the option of adjusting width of tag, rank and type/comm/app fields.

Unexpected Header (FIG. 8)
  Tag: User assigned tag (variable width)
  MPI rank: (variable width)
  Type/Comm/App: Software defined encoding of application, communication group and type (collective or not for instance) (variable width)
  Message location:
    0x0001—UMB;
    0x0002—Receive ring buffer in host memory 118 (when unexpected message buffer overflows); and
    0x0004—Remote handle (when unexpected message is associated with a rendezvous request).
  Message location address: Address of location containing message. This address may be a pointer to a fragment in the UMB, a virtual or physical address in local memory, or a connection identifier to use for the rendezvous ack.
  Size: Size of the message The two most significant bits of the match word are reserved on unexpected headers. They correspond to the wildcard encoding bits of the posted receive header.

An all zero match word indicates an invalid header. Software should avoid all zero scenarios when creating match words.

Posted Receive Header (FIG. 9)
  WC: Wildcard encoding. 00-no wildcard, 01-wildcard tag, 10-wildcard rank, 11-wildcard tag, rank. When tag is wildcarded, Mask0 of the queue descriptor (FIG. 12) is used to mask out the "tag" field when matching. When rank is wildcarded Mask1 of the queue descriptor is used to mask out the "rank" field when matching.
  Match Compl ID: Completion ID deposited in completion entry when there is a successful header match. This field is provided by software when posting the receive for later identification. Others field definitions are the same as before. The buffer is preferably located in local host memory 118. An all zero match word indicates an invalid header. Software should avoid all zero scenarios when creating match words.

Matchers

Each matcher unit 504 is a finite state machine that may implement a pipelined read and compare loop. SIF 110 will provide multiple matcher units 504 that can be scheduled to search different queues in a flexible manner. Each matcher 504 can sustain a rate of 1 match per cycle in the absence of memory port conflicts with other matchers 504. A matcher 504 searching a queue will not overtake another matcher 504 that started earlier and is searching the same queue.

The headers are stored in the header store 502, which may comprise a banked SRAM structure with enough bandwidth to sustain matching at least when access patterns are well behaved.

Programming Interfaces

Posted Receive

Adding Posted Receive Header to Hardware (FIG. 10)

A host bus request describing the posted receive to be added is written to a doorbell in hardware. One doorbell is provided for each supported header queue—up to NUM_H-DR_QUEUES per SIF. Privileged software maps doorbells to a user process allowing the user process to access the doorbell directly.

Structure of posted receive request packet to hardware mirrors the structure of the posted receive header shown in the previous section.

CR: If set to 1 completion is performed when receive is successfully added to PRQ 512. Else, an explicit completion is not needed.

Req Compl ID: Software provided ID for request included in posted completion. For use by software to associate request with completion.

Compl Q: Index to completion queue where completion is to be deposited.

Match Compl ID: Completion ID used when completion is returned following a successful match.

Other field definitions same as before.

Removing Posted Receive from Hardware (FIG. 11)

Software may wish to remove posted receives either when it hits a situation where a receive posted earlier is no longer applicable or when the message to the posted receive is delivered in a manner that does not use SIF (e.g., an intra node message).

A host bus request describing the posted receive to be removed is written to a doorbell in hardware. One doorbell is provided for each supported header queue—up to NUM_H-DR_QUEUES per SIF. Privileged software maps doorbells to a user process allowing the user process to access the doorbell directly.

The request packet to remove a posted receive to hardware is similar to the request packet to add a posted receive. Explicit completions may be performed when removing posted receives.

Queue Descriptors (FIG. 12)

Posted receive queues 512 and unexpected queues 514 are accessed and controlled through a descriptor. There are NUM_HDR_QUEUES descriptors, one for each of the PRQ/UEQ pairs supported on SIF. Access to descriptors is typically restricted to privileged software.

Compl Q: Completion Queue associated with descriptor—when a successful header match occurs an entry is posted in the completion queue;

MMU Ctxt: MMU context to use when a match is found and a message is to be written to a receive buffer in host memory;

Status: 0—Okay. 1—UEQ full. 2—PRQ full. 3—Both queues full. 4—Other error;

PRQ Max Entries: Max entries allowed in PRQ;

UEQ Max Entries: Max entries allowed in UEQ;

PRQ Count: Number of entries in PRQ at any point;

UEQ Count: Number of entries in UEQ at any point;

V: Descriptor valid;

PRQ head pointer: Pointer to head of queue. Search starts at this location;

PRQ tail pointer: Pointer to tail of queue. Insertion is at this location;

UEQ head pointer: Pointer to head of queue. Search starts at this location;

UEQ tail pointer: Pointer to tail of queue. Insertion is at this location;

Interrupt Group: an interrupt identifier that software may use to locate the source of an interrupt;

Mask0: "Tag" wildcard mask; and

Mask1: "Rank" wildcard mask.

Incoming Packets

An incoming packet from the IB fabric to be header matched against posted receives includes a bit in a special IB header field (same field that contains the receive queue pointer) indicating that it should be matched. The packet does not contain a pointer to the header queue to which the packet should be matched against. Instead the packet's target receive queue descriptor contains a pointer to the header queue.

Dump Queue Contents

Registers are provided that software can write to force a dump of selected queue contents to specified locations in memory. This facility is used to move headers from SIF to memory when software wishes to take over header matching—for instance when a queue overflows.

Operation

Incoming IB Packets

Incoming IB packets are accepted by a free HWT, validated against the current state of the connection (or QP in IB terminology), and checked for a valid protection domain at the receive queue. When header matching is enabled in hardware, when the incoming packet indicates that it should be header matched, and when the receive queue points to valid header matching queues, the payload matching field is sent to a free one or more matchers 504 (when all matchers 504 are busy the HWT waits for one to free up). The matcher(s) (e.g., one matcher or a plurality of matchers 504 operating concurrently or in parallel) walks through the PRQ and returns a match result. If a valid match is found, the matching header is removed from the PRQ 512, and the receive buffer pointer from the header is returned to the HWT. The HWT first checks if the receive buffer is large enough to hold the incoming message, and then proceeds to copy the incoming message into the receive buffer. Once the copy is done, a completion entry is written into the completion queue associated with the header queue with status set to SUCCESSFUL_MATCH_COPY_COMPLETE. (When the receive buffer is not large enough a NAK may be returned to sender with a Remote Operational Error code, or the payload may be written to the buffer up to the size of the buffer).

When no match is found in the PRQ 512 for that rank the message is an unexpected message. A header is added to the UEQ 514 after a synchronization sequence to prevent a race between the insertion of the message into the UMB and the addition of new posted receives from the host to the PRQ 512. The packet payload is deposited in the UMB.

New Posted Receives

New posted receives from the host are allocated to the next available matcher 504 or plurality of matchers 504 and are checked against the UEQ 514. When a matcher 504 is not available the posted receives wait for one to become available—flow control is in hardware. When a matcher 504 becomes available, the matcher 504 picks up the next posted receives and walks through the UEQ 514 for the rank and returns a match result. If a match is found, the matching entry is removed from the UEQ 514, and a HWT is picked for service. The HWT initiates a DMA to move the payload into the UMB corresponding to the matching UEQ entry into the buffer in system memory provided by the matching receive, and writes a completion entry into the completion queue associated with the header queue with status set to SUCCESSFUL_MATCH_COPY_COMPLETE. When no match is found, the header is added to the PRQ after a synchronization sequence to prevent a race condition between the addition of the posted receive into the PRQ and the addition of incoming packets to the UEQ 514.

UMB Overflow

When the UMB is full, the payload of an incoming packet is deposited in a temporary buffer in system memory and the header is added to the UEQ 514—the UEQ header carries the location of the payload as described herein (e.g., FIG. 8).

Overflow of the UMB does not stop hardware header matching. When a match is identified on a UEQ entry whose payload is in host memory, SIF 110 will either:

1. Have the HWT initiate DMA reads and writes to copy the message from host memory to the target receive buffer, and then write a completion entry with status set to SUCCESSFUL_MATCH_COPY_COMPLETE; or 2. Write a completion queue entry with pointer to the message in memory and the ID of the matching posted receive, and with status set to SUCCSSFUL_MATCH_NO_COPY. Software will perform the copy.

Header Queue Overflow

When a header queue—PRQ 512 or UEQ 514—overflows, further packet processing is stopped for incoming packets that target the overflowing queue pair, and a host CPU is interrupted with the interrupt group of the overflowing queue's descriptor. Incoming packets targeting this queue are RNR (Resource Not Ready) NAKed (Negative Acknowledged) back to the sender until software resets the status bit in the descriptor or disables header matching for the associated receive queues. A "negative acknowledge" is similar to a "no thank you". When a responder receives a message from a requester, and the targeted resource (say a receive buffer) is temporarily not available, the Infiniband protocol requires that the responder send a RNR-NAK to the requester indicating that the resource is currently not available. The requester may retry later.

Host software treats header queue overflow as a slow case. Several handling options are possible at increasing levels of complexity and performance.

1. Turn off hardware matching permanently (or until a significant reset or quiescing event) for the MPI rank, dump all headers and data into memory, and revert to a software header matching algorithm.

2. When the UEQ 514 overflows, disable hardware search of the UEQ 514 and use all available header store space for matching PRQ 512; search the UEQ 514 in software. This approach is described in greater detail below.

3. Cooperative matching in hardware and software of both PRQ 512 and UEQ 514.

Rendezvous

When a node needs to send a large message (for instance greater than IB MTU size) a rendezvous protocol may be used on the SIF 110 where the sender and receiver first perform a handshake to exchange receive buffer information, followed by the sender performing an RDMA to transfer data, and a message to signal completion of transfer. Typically when header matching is in software, the sequence requires host software involvement to perform the handshake. However, since the SIF 110 performs the header matching in hardware the handshake can be accomplished without host involvement, eliminating latency and overhead of host interrupts. A rendezvous sequence on SIF 110 comprises the following steps:

1. Sending node sends a rendezvous request to the receiving node. The requesting HWT on the sender then waits for a response from the receiver.

2. The receiving node handles the rendezvous request as an incoming message and searches against the PRQ 512. On a match, and if the size of the receive buffer is large enough to hold the request, the receiving node provides the address of the receive buffer to the requesting node along with match completion information. (When receive buffer size is insufficient a remote operation error NAK is returned to the requesting node, or available buffer size may be provided).

3. When a match is not found, the rendezvous request is added to the UEQ 514 and a RNR NAK is returned to the requesting node. The requesting HWT may optionally continue to wait or be released to service other requests. Later, when a new receive is posted, and there is a match against the entry in the UEQ 514, a response is sent to the requesting node with the buffer address of the matching receive, and match completion information.

4. When the requesting node receives the receive buffer address, it performs an RDMA write to the buffer.

5. When the write is completed the requesting node sends a rendezvous complete message to the receiving node that includes match completion information received earlier. On receiving the completion message the receiving node deposits a completion message similar to the normal header match scenario.

As indicated above, the SIF 110 holds large messages in the sender until the corresponding receive buffer is posted at which point the sender RDMAs the content buffer to the receive buffer. This rendezvous approach reduces memory bandwidth on the receiver by avoiding the write and read from a temporary buffer at the receive node. However, it might result in a slight increase in latency since the receiver has to communicate with the sender across the fabric when the receive buffer is posted.

Keeping send resources active while waiting for the rendezvous to complete provides the best rendezvous performance. However, it may block other requests to the same connection from completing during the wait. If this is an issue, software may allocate dedicated connections for rendezvous. Another approach is to send information on the address of the send buffer to the receiving node along with the original rendezvous request, and release send resources. The receiving node (which may comprise client software or embedded logic) will perform an RDMA read of the send buffer when the rendezvous match occurs.

As an illustration of these different approaches we describe four rendezvous scenarios classified based on whether the match occurs immediately and based on the size of the rendezvous request. The four scenarios are:

1. Receive is posted when rendezvous request arrives, and size of the rendezvous is below a threshold (set by software at initialization). Here the sender HWT is active and waiting for a response—the response generated by the responder HWT encodes information on the location of the receive buffer, and the sender HWT issues RDMA writes to the receive buffer.

2. Receive is posted when rendezvous request arrives, and size of the rendezvous is above a threshold. Here even though the sender HWT is active, the rendezvous is still completed in software to avoid holding the send HWT for extended periods working on a single request. Rendezvous message size is controlled by the application, and this provides a means for software to manage HWT utilization when very large requests (say multi GB) are made.

3. Receive is not posted when rendezvous request arrives, and size of the rendezvous is below a threshold (set by software at initialization). Here the sender HWT is inactivated, and later when the receive is posted a requester HWT on the responder node issues RDMA reads to the send buffer to obtain data which it then deposits in the receive buffer.

4. Receive is not posted when rendezvous request arrives, and size of the rendezvous is above a threshold. Here software is involved in completing the rendezvous.

As indicated above, SIF 110 tries to hold large messages in the sender until the corresponding receive buffer is posted, at which point the sender does an RDMA write directly to the receive buffer. This approach reduces memory bandwidth on the receiver by avoiding the write and read from a temporary buffer at the receive node, at the expense of some latency.

In one embodiment, when rendezvous size is very large, even when receive is posted at the time of rendezvous arrival, the rendezvous is completed in software to limit continuous HWT use by a few requesters. If the receive is not posted when the rendezvous request arrives, the sender preferably does not wait for the receive to be posted—it is a non deterministic wait time, and also prevents other requests using the same connection from making forward progress. To avoid the sender waiting, the transaction may be completed from sender hardware in one of two ways—either execute an RDMA read from the responder node, or transition over to a software rendezvous (on larger rendezvous requests).

The four scenarios are described in greater detail below using one embodiment where rendezvous requests and responses are sent over Infiniband using the ATOMIC fetchadd request and response packets.

Receive Posted when Rendezvous Arrives

Sending node sends a rendezvous request to the receiving node as a special ATOMIC fetchadd request. The requesting HWT on the sender then waits for a response from the receiver. The receiving node handles the rendezvous request as an incoming message and searches against the PRQ 512. It will find a match in the PRQ 512 (by definition in this scenario). When the match is found the receiving node provides the address and size of the receive buffer to the requesting node along with match completion information in the ATOMIC acknowledge response. When the HWT at requesting node receives the response, and the request size is less than a threshold, the HWT performs an RDMA write to the buffer up to the provided size. It then sends a message to the receiving node with the completion information. The receiving node processes the completion similar to a normal successful header match completion.

When the request size is greater than a threshold, the HWT posts a completion with information on the target buffer. Software completes the rendezvous by issuing one or more RDMA write requests.

ATOMIC fetachadd request:
ATOMICEth: VA contains Match word, R_key is 7000_00RR, Add Data contains local DMA VT ID and local VA;
ATOMIC Ack response packet;
[63:0] Response Type [8] R-key[8] Buffer address [56];
[127:64] Buffer size; and
[191:128] Completion info [32] R-key [8] Rsvd [24].

Receive not Posted when Rendezvous Arrives Size Less than Threshold

Similar to the prior case, the sending node sends a rendezvous request to the receiving node as a special ATOMIC fetchadd request. The requesting HWT on the sender then waits for a response from the receiver. The receiving node handles the rendezvous request as an incoming message and searches against the PRQ 512, and does not find a match (by definition in this scenario). The rendezvous request is added to the UEQ 514. When size is below set threshold an ATOMIC acknowledge response is sent to the sender indicating receipt of the rendezvous request and a pending completion. The sender then completes the rendezvous request locally but in a pending state. Hardware at the sender side no longer participates in the rendezvous, and the connection may be used by other requests. However, since this is a pending completion, the application may not reuse the buffer yet—i.e., the MPI or other framework does not signal an application level completion.

Later when a matching receive is posted at the receiver, a match against the rendezvous is detected and the rendezvous request is removed from the UEQ 514. The original receiver sends an RDMA read request to the original sender node. The original sender node then reads data out of the original send buffer and returns it, and the data is written into the posted receive buffer at the original receiver node. At the completion of the RDMA read, the original receiver node sends a completion message to the original sender node. Software on the sender, upon receiving the completion, knows that the original Rendezvous request is complete and can reclaim the send buffer.

ATOMIC fetachadd request:
ATOMICEth: VA contains Match word, R_key is 7000_00RR, Add Data contains local DMA VT ID and local VA;
ATOMIC Ack response packet; and
[63:0] Response Type [8] Rsvd [56].

Receive not Posted when Rendezvous Arrives Size Greater than Threshold

Similar to the prior case, the sending node sends a rendezvous request to the receiving node as a special ATOMIC fetchadd request. The requesting HWT on the sender then waits for a response from the receiver. The receiving node handles the rendezvous request as an incoming message and searches against the PRQ 512, and does not find a match (by definition in this scenario). The rendezvous request is added to the UEQ 514. When size is above set threshold an ATOMIC acknowledge response is sent to the sender indicating that a match was not found. At this point the sender completes the rendezvous request, indicating a pending completion. Hardware at the sender side no longer participates in the rendezvous, and the connection may be used by other requests. However, since this is a pending completion the application may not reuse the buffer yet—i.e., the MPI or other framework does not signal an application level completion.

Later when a matching receive is posted at the responder, a match against the rendezvous is detected and the rendezvous request is removed from the UEQ 514. The responder node sends a message to sender with the buffer address. This message may be initiated by hardware or software on the responder. To initiate through software, hardware first posts a completion for the posted receive that software interprets to send the message. At the sender, the HWT that initiated the rendezvous request is no longer active, and the response is similar to a normal message that is processed by software. Software on the sender then issues the RDMA write and once the write is complete it sends a completion to the responder and also completes the rendezvous locally, at which point the rendezvous is complete. Software may also choose to perform the data transfer by having the original receiver node issue RDMA reads to obtain the data.

ATOMIC Ack response packet:

[63:0] Response Type [8] Rsvd [56]

Unexpected Queue in Software and Posted Receive Queue in Hardware

When the unexpected message queue becomes too large or when unexpected messages are rare, software may use this option to conserve header store 502. Here the PRQ 512 is still searched by hardware, and on a match the incoming packet is directly moved into the receive buffer in memory. However, the unexpected queue 514 is maintained in host memory 118 and searched by software.

When software needs to add a posted receive to hardware the following steps may be performed:

Software searches the unexpected queue 514 in host memory 118. If a match is found, the matching entry from the unexpected queue 514 is associated with the receive—when the message is on the SIF 110 (on chip), software initiates a DMA to the new receive buffer, and when the message is in host memory 118, software or hardware performs the copy.

When posted receive does not find a match in the unexpected queue 514, synchronization may be performed to prevent an incoming packet from going into the unexpected queue 514 after the unexpected queue 514 has been searched, but before the receive is added to the PRQ 512.

There are two schemes that differ in how the synchronization is performed:

Scheme 1:

Step 1: After unexpected queue 514 is searched send a signal to hardware that a new posted receive is to be added. The signal will likely be in the form of a posted write to a SIF register.

Step 2: When hardware receives the signal, it stops adding incoming packets to the unexpected queue 514 for the rank (it can continue to process incoming packets that match), and sends a signal to software that it has stopped adding to the unexpected queue 514. This signal may be an update to a SIF internal register or memory location that software will poll.

Step 3: When software gets the signal from hardware, it performs a check of new entries that may have been added to the unexpected queue 514 during the signaling window, and on no match in new entries, adds posted receive to hardware through a doorbell write, and enables further unexpected queue additions.

Scheme 2:

Send the posted receive optimistically to hardware without a synchronization sequence, assuming that in the common case there is no new entry added to the unexpected queue 514 during the race window that will match the new posted receive. Include a tag identifying the last entry in the unexpected queue 514 checked prior to sending the posted receive to hardware. Hardware will check the tag against the last unexpected it has processed for the rank. When tags are the same the posted receive can be added right away. When tags are different, either maintain a set of recent unexpecteds in a small content addressable memory (CAM) in hardware for a quick check, or indicate a failure to software and have software retry the posting (perhaps with full synchronization the second time). The term "unexpected" refers to entries in the unexpected queue 514, or incoming messages that don't find any match in the posted receive queue 512.

Intra Node Messages

An application may need to send intra node messages; i.e., messages from one MPI rank to another within the same SMP node. Intra node transfers may use the hardware header matching infrastructure by sending the message through a loopback path back to the node. The message will then enter the header matching infrastructure and be handled in a manner similar to messages from remote nodes. Performing the transfer through such a loopback might be simplest to implement since the any_source wild card allowed on receives implies that intra node and inter node sends might target the same set of receive buffers, and implementations need to ensure that the same buffer does not get associated with two sends. In certain situations (e.g., communication dominated by intra node transfers) implementations might want to use SMP communication mechanisms to send intra node messages instead of loop back. Such implementations may use a software based header matching scheme, and/or the posted receive removal mechanism (described above) to identify and remove target buffers for intra node sends.

Multiple SIFs

When there are multiple SIFs 110 on a node, each SIF 110 performs its own header matching independent of the others. If a single MPI rank receives messages from more than one SIF 110, it becomes complex for software to maintain PRQs 512 in all the SIFs 110 and keep them synchronized.

For the general application scenario, when multiple SIFs 110 are on a platform, it is recommended that each MPI rank be allowed to receive from one and only one SIF 110. When a MPI rank is created it is assigned a SIF 110, and from thereon all communications targeting the MPI rank arrives through that SIF 110.

This might reduce the interconnect bandwidth that one MPI rank can exploit. On applications where such a reduction in interconnect bandwidth per MPI rank is undesirable, on a case by case basis, specialized schemes in software may be implemented, where an MPI rank is allowed to use multiple SIFs 110 while maintaining a consistent view of PRQs 512 among the SIFs 110 (e.g., when an application does not use any_source wildcards, paths may be partitioned among SIFs 110 based on source rank). In another embodiment, a flag is associated with each receive header that is posted to multiple SIFs 110. The flag is set to zero when the receive is posted, and is atomically fetched-and-set to a non-zero value when there is a match on the header. If the fetch-and-set returns zero, the match is valid. If the fetch-and-set returns non-zero, another SIF 110 has already taken the posted receive; the entry is deleted and search continues.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A compute node interface device for interfacing between a compute node and a fabric, wherein the compute node interface device comprises:

a memory, wherein the memory comprises a plurality of posted receive queues, wherein each of the posted receive queues is configured to store receive requests from a process executing on the compute node, wherein the receive requests include headers; and a plurality of matcher units coupled to the memory, wherein each of the plurality of matcher units is implemented in hardware;

wherein for a first send request received by the compute node interface device, each of at least a first plural subset of the plurality of matcher units is configured to perform header matching in parallel to determine if a header in the first send request matches any headers in any of the plurality of posted receive queues;

wherein for a second send request received by the compute node interface device, each of at least a second plural subset of the plurality of matcher units is configured to perform header matching in parallel to determine if a header in the second send request matches any headers in any of the plurality of posted receive queues;

wherein the first plural subset of the plurality of matcher units and the second plural subset of the plurality of matcher units are configured to perform header matching for the first send request and the second send request concurrently;

wherein if a header in the send request matches a header of a receive request in one of the plurality of posted receive queues, the compute node interface device is configured to store the send request in a receive buffer.

2. The compute node interface device of claim 1, wherein the plurality of matcher units is configured to perform header matching according to a Message Passing Interface (MPI) protocol.

3. The compute node interface device of claim 1, wherein the first receive request comprises a header having a first field containing a wildcard value;

the compute node interface device further comprising:
a second memory coupled to the plurality of matcher units, wherein the second memory stores a header mask;
wherein at least one of the matcher units is operable to use the header mask during header matching to mask out the first field containing the wildcard value.

4. The compute node interface device of claim 1, wherein the compute node comprises a host CPU and a host memory; and
wherein the plural subset of the plurality of matcher units perform header matching to implement a rendezvous data transfer protocol.

5. The compute node interface device of claim 1, wherein the compute node interface device is configured to perform header matching for intra compute node transfers in response to a command received by host software executing on the compute node.

6. The compute node interface device of claim 1, wherein the compute node interface device is configured to synchronize header matching with one or more other compute node interface devices that interface to the compute node.

7. The compute node interface device of claim 1, wherein the compute node interface device is configured to dynamically adjust memory allocation of the posted receive queues for different processes executing on the compute node.

8. The compute node interface device of claim 1, wherein the memory further comprises a plurality of unexpected queues; and
wherein if a header in the first send request does not match any headers in the plurality of posted receive queues, the compute node interface device is configured to store the header of the send request in one of the unexpected queues.

9. The compute node interface device of claim 8, wherein when a new receive request is stored in one of the posted receive queues, at least a plural subset of the plurality of matcher units is configured to perform header matching to determine if a header in the new receive request matches any headers in any of the plurality of unexpected queues.

10. The compute node interface device of claim 8, wherein the memory is dynamically partitioned among the plurality of posted receive queues and unexpected queues to provide separate queues for different applications or MPI ranks.

11. The compute node interface device of claim 8, wherein the compute node comprises a host CPU and a host memory; and
wherein the compute node interface device is configured to implement at least a subset of the unexpected queues in the host memory of the compute node.

12. The compute node interface device of claim 8, wherein the send request includes a payload comprising data;
the compute node interface device further comprising:
an unexpected message buffer coupled to the memory, wherein the unexpected message buffer is configured to store a payload of a send request that does not have a matching header in any of the plurality of posted receive queues.

13. The compute node interface device of claim 8, wherein the compute node interface device is configured to dynamically adjust relative memory allocation of the posted receive queues and the unexpected queues.

14. A method for performing header matching in a first compute node, wherein the first compute node is in a cluster, the method comprising:
storing headers of receive requests from the first compute node in at least one posted receive queue;
receiving a first send request, wherein the first send request has a first send request header;
performing first header matching of the first send request header with headers of the receive requests stored in the at least one posted receive queue, wherein said first header matching is performed by a first plurality of hardware matching units concurrently accessing the at least one posted receive queue, wherein each of the first plurality of hardware units is implemented in hardware, wherein said header matching determines if the first send request header matches any headers of the receive requests in the at least one posted receive queue; and
if the first send request header matches a header in the at least one posted receive queue, storing the first send request in a receive buffer;
receiving a second send request, wherein the second send request has a second send request header;
performing second header matching of the first send request header with headers of the receive requests stored in the at least one posted receive queue, wherein said second header matching is performed by a second plurality of hardware matching units concurrently accessing the at least one posted receive queue, wherein each of the second plurality of hardware units is implemented in hardware, wherein said header matching determines if the second send request header matches any headers of the receive requests in the at least one posted receive queue;
wherein said performing first header matching and said performing second header matching are performed concurrently; and
if the second send request header matches a header in the at least one posted receive queue, storing the second send request in a receive buffer.

15. The method of claim 14, further comprising:
if the first send request header does not match any headers in the at least one posted receive queue, storing the first send request header in at least one unexpected queue;

receiving another receive request after said storing the first send request header in the at least one unexpected queue;

performing header matching of a header of the another receive request and one or more send request headers in the unexpected queue, wherein said header matching is performed by a plurality of hardware matching units concurrently accessing the at least one unexpected queue; and if the header of the another receive request matches the first send request header in the at least one unexpected queue, storing the first send request in a receive buffer indicated by the another receive request.

16. A compute node interface device for interfacing between a compute node and a fabric, wherein the compute node interface device comprises:

a memory, wherein the memory comprises a plurality of posted receive queues, wherein each of the posted receive queues is configured to store receive requests from a process executing on the compute node, wherein the receive requests include headers; and a plurality of matcher units coupled to the memory, wherein each of the plurality of matcher units is implemented in hardware;

wherein a first plural subset of the plurality of matcher units is configured to perform header matching for a first send request;

wherein a second plural subset of the plurality of matcher units is configured to perform header matching for a second send request; and wherein the first plural subset and the second plural subset are configured to operate concurrently;

wherein if a header in the send request matches a header of a receive request in one of the plurality of posted receive queues, the compute node interface device is configured to store the send request in a receive buffer.

* * * * *